UNITED STATES PATENT OFFICE.

CLEMENS GROOS, OF RIVERSIDE, NEW JERSEY.

HAIR-TONIC.

SPECIFICATION forming part of Letters Patent No. 413,395, dated October 22, 1889.

Application filed July 17, 1889. Serial No. 317,793. (No specimens.)

*To all whom it may concern:*

Be it known that I, CLEMENS GROOS, of Riverside, in the county of Burlington and State of New Jersey, have invented a new and useful Hair-Tonic or Composition of Matter, to be Used for Making Hair Grow on the Human Skin, of which the following is a specification.

The composition consists of the following ingredients, combined in the proportions stated, viz: For filling a three-ounce bottle with the mixture I use one tea-spoonful of the pollen of the pine-blossom, one-quarter of alcohol, and three-quarters of water. The ingredients are thoroughly mixed by agitation.

In using the above-named composition the skin is rubbed several times a day with about thirty or forty drops of the mixture, and the rubbed part is kept covered for a short time, so as to prevent the rapid evaporation of the applied mixture.

By the use of the above composition the hair is prevented from falling out and a new growth of hair is readily obtained, as the composition of matter thoroughly cleans the skin in such a manner as to permit the hair-roots remaining in the skin to grow again.

Having thus fully described my invention, I claim as new and desire to secure by Letters Patent—

The herein-described hair-tonic or composition of matter to be used for making hair grow on the human skin, consisting of water, alcohol, and the pollen of pine-blossom, combined in the proportions specified.

CLEMENS GROOS.

Witnesses:
 THEO. G. HOSTER,
 C. SEDGWICK.